J. BERGER.
DRAFT APPLIANCE FOR HARROWS.
APPLICATION FILED MAY 1, 1920.
1,379,518. Patented May 24, 1921.
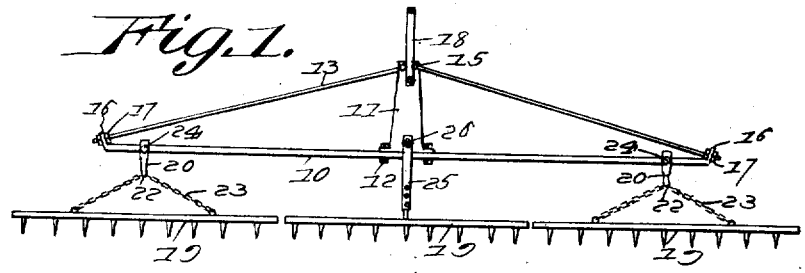
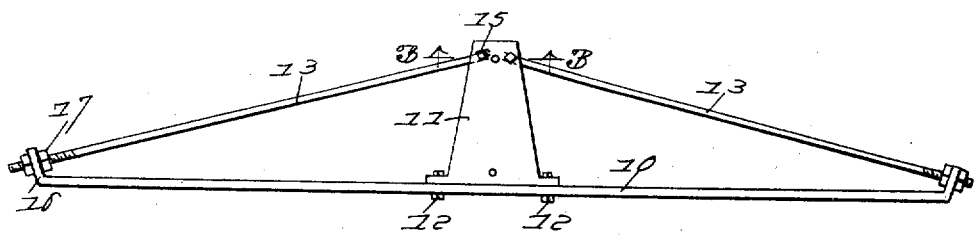
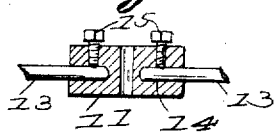
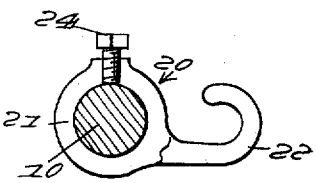
Inventor
Joseph Berger,
By
Attorney

UNITED STATES PATENT OFFICE.

JOSEPH BERGER, OF SPALDING, NEBRASKA.

DRAFT APPLIANCE FOR HARROWS.

1,379,518.  Specification of Letters Patent.  Patented May 24, 1921.

Application filed May 1, 1920. Serial No. 378,161.

*To all whom it may concern:*

Be it known that I, JOSEPH BERGER, a citizen of the United States of America, residing at Spalding, in the county of Greeley and State of Nebraska, have invented new and useful Improvements in Draft Appliances for Harrows, of which the following is a specification.

The object of the invention is to provide a draft appliance suitable for use in connection with harrows and similar agricultural implements and machines wherein provision is made for adapting it to varying number of harrows or other implements or harrow sections or members to the end that the number and disposition of the harrows or harrow sections relatively may be modified to suit the crops to be cultivated or the condition of the soil which is to be worked and with this object in view the invention consists in a construction and combination of parts of which a preferred embodiment is shown in the accompanying drawings, in which:—

Figure 1 is a plan view of the appliance in connection with which are shown three harrow sections.

Fig. 2 is a detail plan view of the device detached.

Fig. 3 is a detail section on the plan indicated by the line 3—3 of Fig. 2.

Fig. 4 is a detail view of one of the draft hooks.

The appliance consists essentially of a draft bar 10 which centrally supports a draft block 11 which may be bolted thereto as shown at 12 and tension rods 13 extending respectively from the extremities of the draft bar to the forward end of the block where they will fit in seats 14 formed in said block and are secured by set screws 15 or the equivalents thereof as shown in detail in Fig. 3. The extremities of the draft bar are forwardly turned to form ears 16 through which the threaded outer ends of the tension rods project and are engaged by nuts 17 or the equivalents thereof so that the relative tension of the rods may be adjusted to suit the conditions of use and to compensate for any unequalizing of the expansion and contraction of the members of the device.

The forward end of the draft block is equipped with links 18 to which a draft clevis or the like may be connected or by means of which an attachment may be made to a tractor or like means for operating the harrows or other device which are connected with the draft appliance.

The connection of the draft appliance with the harrows indicated at 19 may consist of draft hooks 20 shown in detail in Fig. 4 and consisting of links 21 for embracing the draft bar 10 and tongues 22 extending from said links for engagement with draft chains 23 or the equivalent thereof, said links being secured at the desired adjustment upon the draft bar by means of set screws 24 or the like. The center harrow section or member may be connected with the draft appliance by means of links 25 which are secured at their forward ends by means of a bolt 26 with the draft block inasmuch as the arrangement of said block at the center of the draft bar prevents the engagement of the latter at this point with one of the draft hooks.

It will be obvious that in use the strain of the draft applied to the links 18 will be communicated through the draft block 11 to both the center and the extremities of the draft bar so that harrows or other soil working implements connected with the draft bar at any portions of the length thereof will receive their proportionate effect of the force of the draft and therefore the number of sections or implements may be varied within the range of the length of the draft bar to suit the condition of the crops to be cultivated.

What is claimed is:—

1. A draft appliance having a transverse draft bar and an intermediate forwardly extending draft block connected at its forward end to the extremities of the draft bar by tension rods, a draft link being connected with the said block.

2. A draft appliance having a transverse draft bar and a central forwardly extending draft block, tension rods extending from the forward extremities of the draft block to the ends of the draft rod and means for adjusting the tension of said rods, a draft link being connected with the forward end of the draft block.

3. A draft appliance having a transverse draft bar provided with a central draft block, tension rods extending from the forward end of the draft block to the extremities of the draft bar, and draft hooks adjustably mounted upon the draft bar for connection with the soil working implements.

In testimony whereof he affixes his signature.

JOSEPH BERGER.